(12) United States Patent
Xiao

(10) Patent No.: US 11,953,627 B2
(45) Date of Patent: Apr. 9, 2024

(54) TECHNIQUES FOR MULTIPLEXING OPTICAL BEAMS IN COHERENT LIDAR SYSTEMS

(71) Applicant: AEVA, INC., Mountain View, CA (US)

(72) Inventor: Shijun Xiao, Foster City, CA (US)

(73) Assignee: Aeva, Inc., Mountain View, CA (US)

( * ) Notice: Subject to any disclaimer, the term of this patent is extended or adjusted under 35 U.S.C. 154(b) by 7 days.

(21) Appl. No.: 17/961,026

(22) Filed: Oct. 6, 2022

(65) Prior Publication Data

US 2023/0296732 A1    Sep. 21, 2023

Related U.S. Application Data

(63) Continuation of application No. 17/655,732, filed on Mar. 21, 2022, now Pat. No. 11,486,975.

(51) Int. Cl.

| | |
|---|---|
| *G01S 7/48* | (2006.01) |
| *G01S 7/481* | (2006.01) |
| *G01S 17/34* | (2020.01) |
| *G01S 17/58* | (2006.01) |
| *G01S 17/89* | (2020.01) |

(52) U.S. Cl.
CPC .......... *G01S 7/4817* (2013.01); *G01S 7/4815* (2013.01); *G01S 7/4816* (2013.01); *G01S 17/34* (2020.01); *G01S 17/58* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 11,022,683 | B1 | 6/2021 | Rezk |
| 2011/0205523 | A1 | 8/2011 | Rezk et al. |
| 2019/0064358 | A1 | 2/2019 | Desai et al. |
| 2019/0302268 | A1 | 10/2019 | Singer et al. |

*Primary Examiner* — Hovhannes Baghdasaryan
(74) *Attorney, Agent, or Firm* — Womble Bond Dickinson (US) LLP

(57) ABSTRACT

A light detection and ranging (LiDAR) system that includes a first beam splitter to multiplex a first optical beam and a second optical beam into a combined beam having orthogonal linear polarizations. The system also includes lensing optics to emit the combined beam towards a target and collect light returned from the target in a return optical beam to be received by the first beam splitter. The first beam splitter demultiplexes the return optical beam into a first return beam and a second return beam having orthogonal linear polarizations. The system also includes an optical element to generate a first beat frequency from the first return beam and to generate a second beat frequency from the second return beam. The system also includes a signal processing system to determine a range and velocity of the target from the first beat frequency and the second beat frequency.

20 Claims, 5 Drawing Sheets

TECHNIQUES FOR MULTIPLEXING OPTICAL BEAMS IN COHERENT LIDAR SYSTEMS

CROSS-REFERENCE TO RELATED APPLICATIONS

This application is a continuation of U.S. patent application Ser. No. 17/655,732, filed on Mar. 21, 2022, the entire contents of which is incorporated herein by reference in its entirety.

FIELD OF INVENTION

The present disclosure is related to light detection and ranging (LiDAR) systems.

BACKGROUND

In coherent LiDAR techniques such as Frequency-Modulated Continuous-Wave radar (FMCW), both the distance and the relative radial speed of a target affects the mixing frequency between the Local Oscillator (LO) and the return signal. To sense both distance and speed, conventional systems using the aforementioned techniques typically use frequency modulation signals referred to as a down-chirp and an up-chirp. The down-chirp and the up-chirp can be carried within the same optical beam. To sense both distance and speed simultaneously, both the up-chirp and the down-chirp need to be synchronized to occur at the same time.

Prior art systems typically use techniques, such as "wavelength multiplexing", to combine and separate up-chirps and down-chirps in order to simultaneously calculate distance and speed, but these systems need to have two optical sources that have different wavelengths in order to make the calculations discussed above. For example, in coarse wavelength multiplexing, wavelengths may be different by as much as 20 nanometers.

Also, having two different wavelengths adds complexity to the LiDAR system since both the photonics and the free space optical components must be designed to handle both wavelengths. Additionally, the performance of the optical devices used in LiDAR systems, such as the photonics, optical waveguides, and the like, are very sensitive to changes in wavelength. Accordingly, a variety of design considerations and performance tradeoffs are usually made to ensure that the optical system can handle the two wavelengths with suitable performance characteristics. For example, in the free space optics, the coating performance can be designed for one wavelength, and the lens performance can be best designed for one wavelength.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LiDAR systems and methods for detecting distance and relative speed of objects. More specifically, the present disclosure described improved techniques for performing simultaneous measurement of distance and speed using a single optical beam.

As described above, to measure of distance and speed simultaneously, the optical beam is frequency modulated to generate an up-chirp and down-chirp at substantially the same time, and a multiplexing method is used to separate the two signals, such as wavelength multiplexing. However, one drawback of wavelength-based multiplexing is that the optical devices are very sensitive to wavelength. Thus, performance tradeoffs are made to ensure suitable performance at both wavelengths.

The present techniques enable both the up-chirp and the down-chirp to occur simultaneously and at the same frequency range. Because both signals are using the same frequency range, the wavelength dependence or color imbalance encountered in wavelength multiplexing is eliminated allowing the performance of the photonics and optics to be more effectively optimized at a single nominal frequency. Rather than wavelength multiplexing, the two frequency modulation signals are polarization multiplexed. To accomplish this, two orthogonal linear polarizations, referred to as S and P, can be combined into one using a polarization splitter or other birefringent devices including prisms. The same polarization splitter can be used to combine the S and P polarizations for the incident optical beam and to separate the S and P polarizations for the return optical beam.

In some embodiments, the two optical beams can originate from the same optical source. The same optical source can be used to generate the two optical beams by passing the single optical beam from the optical source into a balanced optical power splitter. The use of a single optical source can reduce the system complexity and cost. Using a single optical source for both beams may be suitable in situations wherein there is a low expectation of substantial polarization crosstalk.

In some situations, such as outdoor environments, there may be greater expectation of polarization crosstalk wherein some portion of the S polarization gets transformed into a P polarization state. To minimize polarization crosstalk, two optical sources at the same nominal wavelength may be used to generate separate optical beams. Although at the same nominal wavelength, small differences in the wavelengths between the two sources ensure that the return signal will be coherently mixed with the local oscillator from the same source.

In the following description, reference may be made herein to quantitative measures, values, relationships or the like. Unless otherwise stated, any one or more if not all of these may be absolute or approximate to account for acceptable variations that may occur, such as those due to engineering tolerances or the like.

Figure 1:
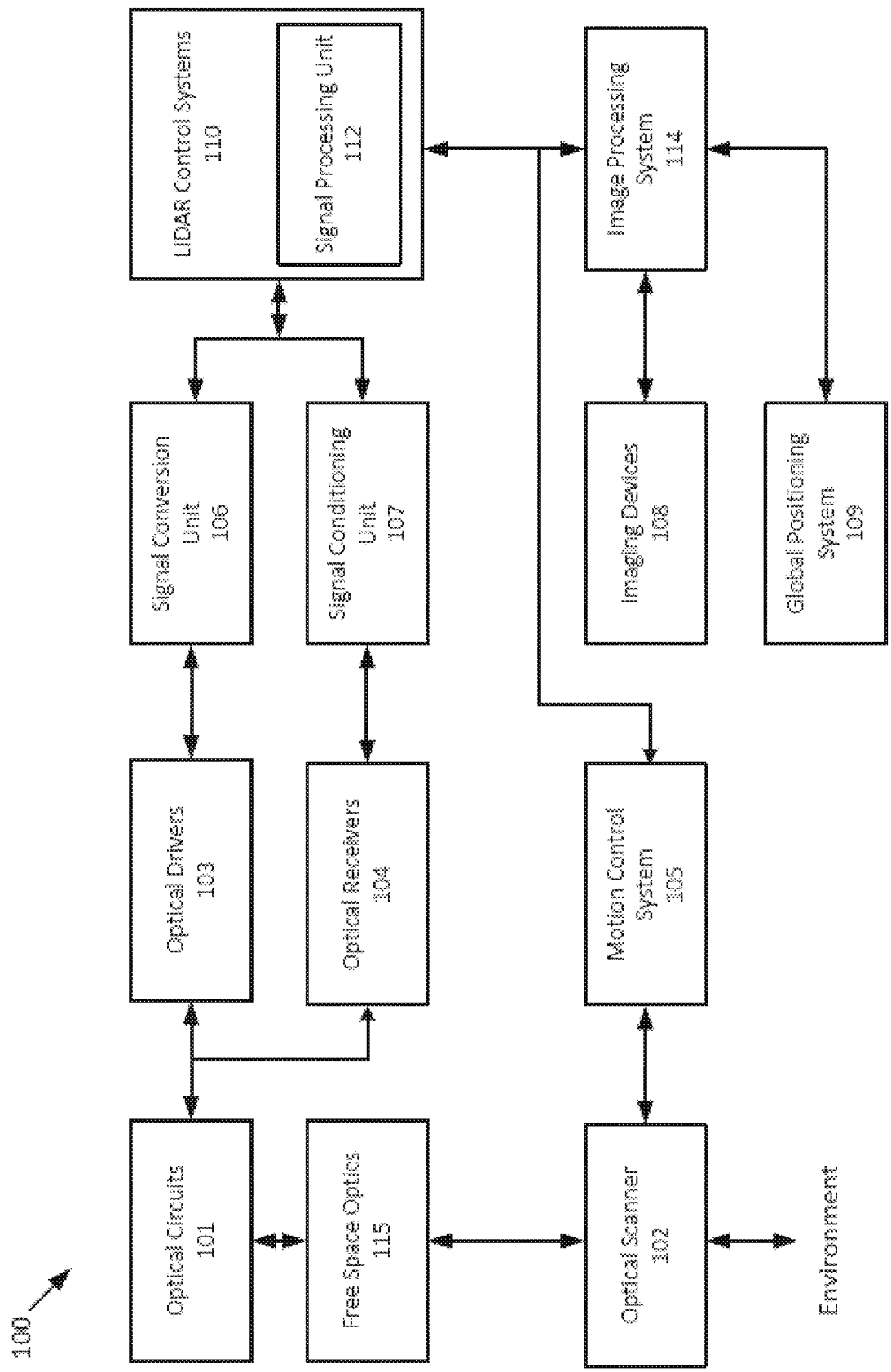
FIG. 1 is a block diagram of an example LiDAR system according to embodiments of the present disclosure.

FIG. 1 is a block diagram of an example LiDAR system 100 according to example implementations of the present disclosure. The LiDAR system 100 includes one or more of each of a number of components, but may include fewer or additional components than shown in FIG. 1. As shown, the LiDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LiDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LiDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LiDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
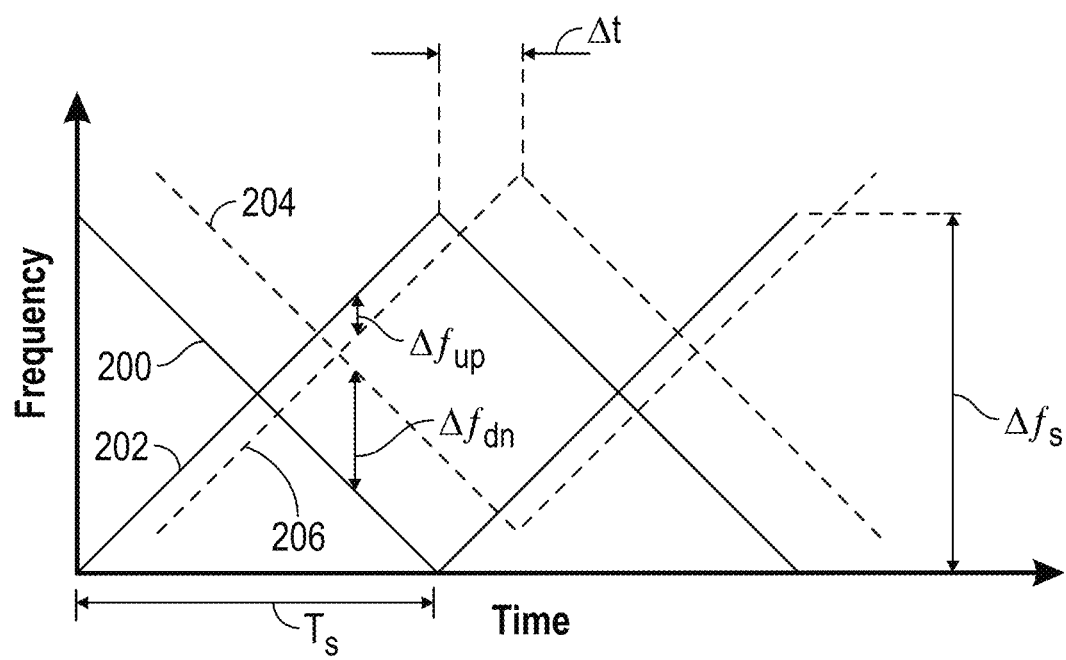
FIG. 2 is a time-frequency diagram of FMCW scanning signals that can be used by a LiDAR system according to some embodiments.

FIG. 2 is a time-frequency diagram of FMCW scanning signals that can be used by a LiDAR system according to some embodiments. The FMCW scanning signals 200 and 202 may be used in any suitable LiDAR system, including the system 100, to scan a target environment. The scanning signal 200 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 200 occurs in unison with the down-chirp on scanning signal 202.

FIG. 2 also depicts example return signals 204 and 206. The return signals 204 and 206, are time-delayed versions of the scanning signals 200 and 202, where $\Delta t$ is the round trip time to and from a target illuminated by scanning signal 201. The round trip time is given as $\Delta t = 2R/v$, where R is the target range and v is the velocity of the optical beam, which is the speed of light c. The target range, R, can therefore be calculated as $R = c(\Delta t/2)$.

In embodiments, the time delay $\Delta t$ is not measured directly, but is inferred based on the frequency differences between the outgoing scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference between the outgoing scanning waveform and the return signal, which is linearly related to the time delay $\Delta t$ by the slope of the triangular waveform.

If the return signal has been reflected from an object in motion, the frequency of the return signal will also be effected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$. The beat frequencies $\Delta f_{up}$ and $\Delta f_{dn}$ are related to the frequency difference cause by the range, $\Delta f_{Range}$, and the frequency difference cause by the Doppler shift, $\Delta f_{Doppler}$, according to the following formulas:

$$\Delta f_{up} = \Delta f_{Range} - \Delta f_{Doppler} \qquad (1)$$

$$\Delta f_{dn} = \Delta f_{Range} + \Delta f_{Doppler} \qquad (2)$$

Thus, the beat frequencies $\Delta f_{up}$ and $\Delta f_{dn}$ can be used to differentiate between frequency shifts caused by the range and frequency shifts caused by motion of the measured object. Specifically, $\Delta f_{Doppler}$ is the difference between the $\Delta f_{up}$ and $\Delta f_{dn}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range} \frac{cT_s}{2\Delta f_s} \qquad (3)$$

$$\text{Velocity} = \Delta f_{Doppler} \frac{\lambda_c}{2} \qquad (4)$$

In the above formulas, $\lambda_c = c/f_c$ and $f_c$ is the center frequency of the scanning signal.

The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LiDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at a same moment in time, as shown in FIG. 2. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. In order to measure both beat frequencies at the same time, the up-chirp and down-chirp can be synchronized and transmitted simultaneously using two signals that are multiplexed together. The multiplexing is performed by controlling the polarization of the signals, as will be described in greater detail in FIGS. 3 and 4 below.

Figure 3:
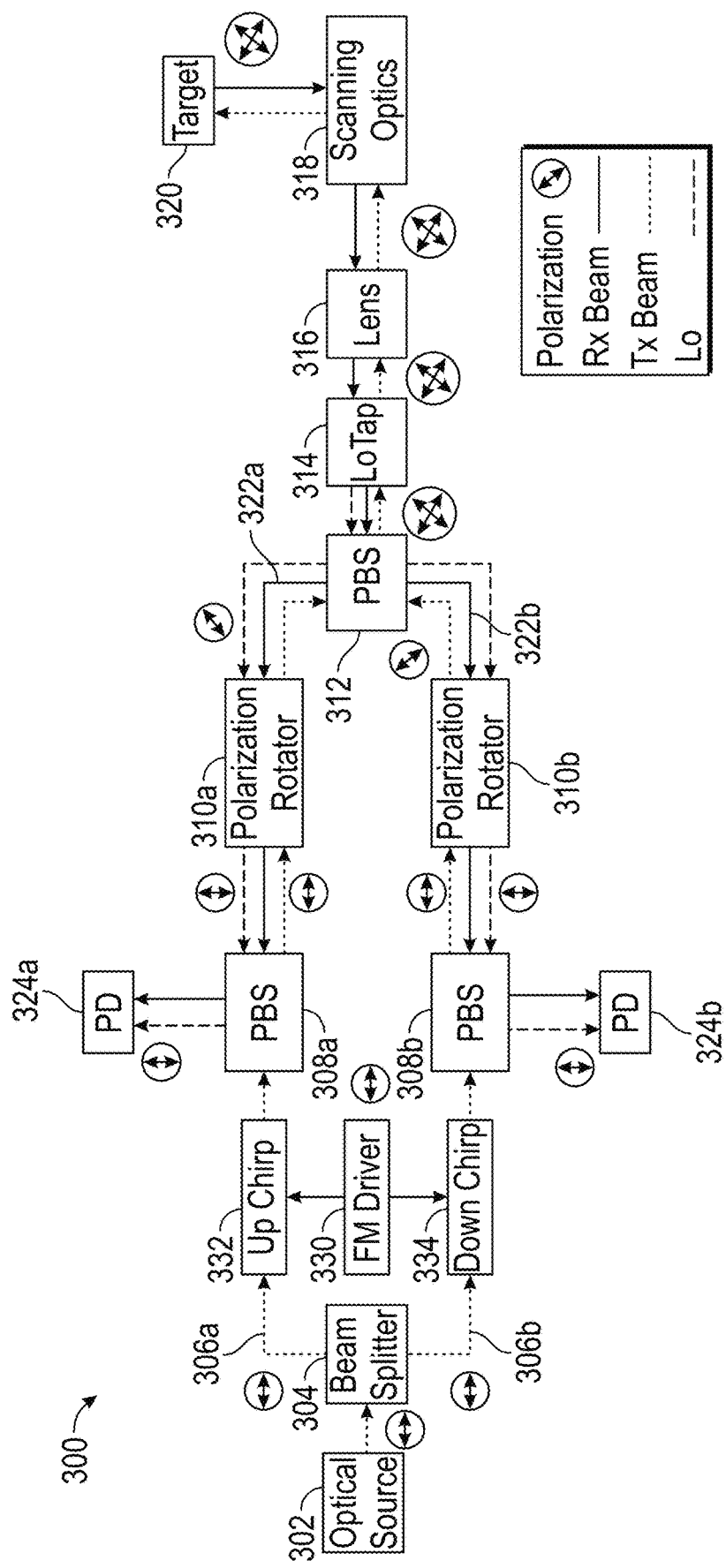
FIG. 3 illustrates an example LiDAR system according to example embodiments of the present disclosure.

FIG. 3 illustrates an example LiDAR system according to example embodiments of the present disclosure. Components of the LiDAR system 300 may be included within the optical circuits 101, free space optics 115, and optical scanner 102 shown in FIG. 1. As shown in FIG. 3, the LiDAR system 300 includes an optical source 302 configured to emit an optical beam having a linear polarization. As depicted in the Figures described herein (e.g., FIGS. 3 and 4), the polarizations of the various optical beams are indicated by a polarization symbol shown as a double ended arrow within a circle. It will be appreciated that the indicated polarizations are shown merely to indicate the relative polarization between the various optical beams, not the actual orientation relative to the environment. For example, although the polarization at the output of the optical source 302 is shown as a horizontal line, the actual polarization with respect to the environment may be any suitable orientation including horizontal, vertical or any value in between.

The LiDAR system 300 includes an optical source 302, which outputs an optical beam. The optical beam output by the optical source may be referred to as an outgoing, transmitted, or incident beam, while the beam reflected from the target may be referred to herein as the incoming, received, or return beam. The output of the optical source 302 is provided to a beam splitter 304, which may be configured to split a beam into two equal-power optical beams, referred to herein as a first optical beam 306a and a second optical beam 306b, both of which have the same polarization state as the beam input to the beam splitter 304.

In some embodiments, the optical beam output by the optical source 302 is not modulated and frequency modulation is performed externally to the optical source 302 after the outgoing optical beams 306a and 306b have been split. For example, the optical beam 306a may pass through an up-chirp generator 332, while the optical beam 306b passes through a down-chirp generator 334. The up-chirp generator 332 and down-chirp generator 334 are both controlled by a frequency modulation driver 330, which may be communicatively coupled, for example, to the LiDAR control systems 110 (FIG. 1). The optical beams output by the up-chirp generator 332 and down-chirp generator 334 include the frequency modulated signals referred to as the up-chirp and the down-chirp, which are described above in relation to FIG. 2.

The LiDAR system 300 also includes a first polarization beam splitter 308a and a second polarization beam splitter 308b. The polarization beam splitters 308a and 308b are configured to pass their respective optical beams 306a and 306b to one of two output ports depending on the polarizations of the optical beams. For the outgoing optical beams, the polarization of both beams is such that both optical beams 306a and 306b are passed to corresponding polarization rotators 310a and 310b.

The polarization rotators 310a and 310b are configured to rotate the polarization of an optical beam by a specified amount for any optical beam passing through. The polarization rotators 310a and 310b may be faraday rotators, or any other suitable type of polarization rotator, including birefringent rotators, prism rotators, and others. In this example, the polarization rotator 310a is configured to apply 45 degrees of rotation to the first optical beam 306a and the polarization rotator 310b is configured to apply negative 45 degrees of rotation to the second optical beam 306b. Accordingly, as shown in FIG. 3, the polarizations of the first optical beam 306a and the second optical beam 306b differ by ninety degrees at the outputs of the polarization rotators 310a and 310b, i.e., the first optical beam 306a and the second optical beam 306b are orthogonal. In some scenarios, the polarization of the first optical beam 306a may be referred to as an "S-polarization," and the polarization of the second optical beam 306b may be referred to as a "P-polarization." Additionally, it will be appreciated that the degree of rotation applied in an actual implementation may be approximate to the figures provided herein. For example, a rotation of approximately 45 degrees may vary by +/−10 percent.

The first optical beam 306a and the second optical beam 306b are received at different ports of a polarization beam splitter 312, which combines the two beams into a single optical beam with a first polarization component and a second polarization component that is orthogonal to the first polarization component and results in the two components each being linearly polarized.

The LiDAR system 300 also includes one or more local oscillator taps to provide a low power local oscillator signal. In the example shown in FIG. 3, the LiDAR system 300 includes a single local oscillator tap 314, which is configured to receive the output of the polarization beam splitter 312. According to some embodiments, the local oscillator tap 314 may be an optical power divider that reflects a portion of the outgoing signal back toward the input to form the local oscillator signal. For example, the local oscillator tap 314 may reflect a lower percentage of the outgoing signal to form the local oscillator signal. By placing the local oscillator tap 314 at the output of the polarization beam splitter 312, a single local oscillator tap can be used to provide both local oscillator signals.

The LiDAR system 300 also includes lensing optics 316 and scanning optics 318, each configured to transmit the combined optical beam towards a target, and collect light incident upon the target into a return path, the light being collected into a return optical beam. Additional lensing optics and scanning optics may be included for transmitting additional optical beams. It will also be appreciated that in some use cases, there will be more than one target and possibly several targets.

The return optical beam reflected from the target will have the same or similar polarization state as the incident optical beam. Thus, the return optical beam will also include two linear orthogonal polarization components, although there may be some polarization crosstalk between the two components, such that some portion of one polarization is transformed by the target into a different polarization. The return beam is received at the local oscillator tap 314 where the return beam mixes with a local oscillator signal. Specifically, in the example shown in FIG. 3, the two orthogonal components of the return beam are combined with the two orthogonal components of a local oscillator signal.

The return beam and the local oscillator signal are both received at the polarization beam splitter 312, which splits the beams to different outputs, depending on the polarization. Specifically, the components of the return beam and the local oscillator signal that have a 45-degree polarization are returned to polarization rotator 310a, and the components of the return beam and the local oscillator signal that have a negative 45-degree polarization are returned to polarization rotator 310b. Thus, each polarization component of the return beam remains combined with its corresponding local oscillator signal of the same polarization. The return beams are shown in FIG. 3 as a first return beam 322a and second return beam 322b. It will be appreciated that the designation of a first return beam and a second return beam is merely meant to distinguish between the two beams and it is not meant to indicate a temporal difference or ordering between the beams.

The first return beam 322a is received by the polarization rotator 310a, which applies 45 degrees of rotation to the first return beam 322a and its corresponding local oscillator. The second return beam 322b is received by the polarization rotator 310b, which applies negative 45 degrees of rotation to the second return beam 322b and its corresponding local oscillator. Accordingly, both of the return beams 322a and 322b that exit the polarization rotators on the return path are transformed to the same polarization state, which is shown in FIG. 3 as vertical. Additionally, each of the return beams 322a and 322b is orthogonal to their corresponding outgoing beams, which enables the return beams to be diverted along a non-reciprocal optical path by the polarization beam splitters 308a and 308b.

The first return beam 322a and its corresponding local oscillator signal are both directed to a first photodetector 324a by the polarization beam splitter 308a. At the same time, the second return beam 322b and its corresponding local oscillator signal are both directed to a second photodetector 324b by the polarization beam splitter 308b. The frequency difference between the first return beam 322a and the local oscillator signal are detected as a first beat frequency, while the frequency difference between the second return beam 322b and the local oscillator signal are detected as a second beat frequency. As explained above in relation to FIG. 2, the range and velocity of the target are determinable from the first beat frequency and the second beat frequency.

Using the procedures described in FIG. 3, embodiments of the present disclosure perform polarization multiplexing with one optical source. In this fashion, one or more processors (e.g., signal processor 112 in FIG. 1) can be configured to calculate distance, range and/or velocity simultaneously based on the simultaneous transmission of the up-chirp and down-chirp signals in a manner that mitigates engineering complexities traditionally caused by conventional wavelength multiplexing (or similar) techniques. In some scenarios, the LiDAR system 300 may be suitable for environments in which many of the targets are known to have more reflective surfaces, such as indoor environments, including a home, or a factory floor, for example.

It will be appreciated that various alterations may be made to the system 300 and that some components may be omitted or added without departing from the scope of the disclosure. For example, embodiment of the LiDAR system 300 may include one or more optical amplifiers, which may be disposed, for example, at the output of the optical source 302, the output of the beam splitter 304, and other locations. Additionally, rather than a single local oscillator tap 314, the LiDAR system 300 could include separate local oscillator taps for each of the two optical signal 306a and 306b.

Figure 4:
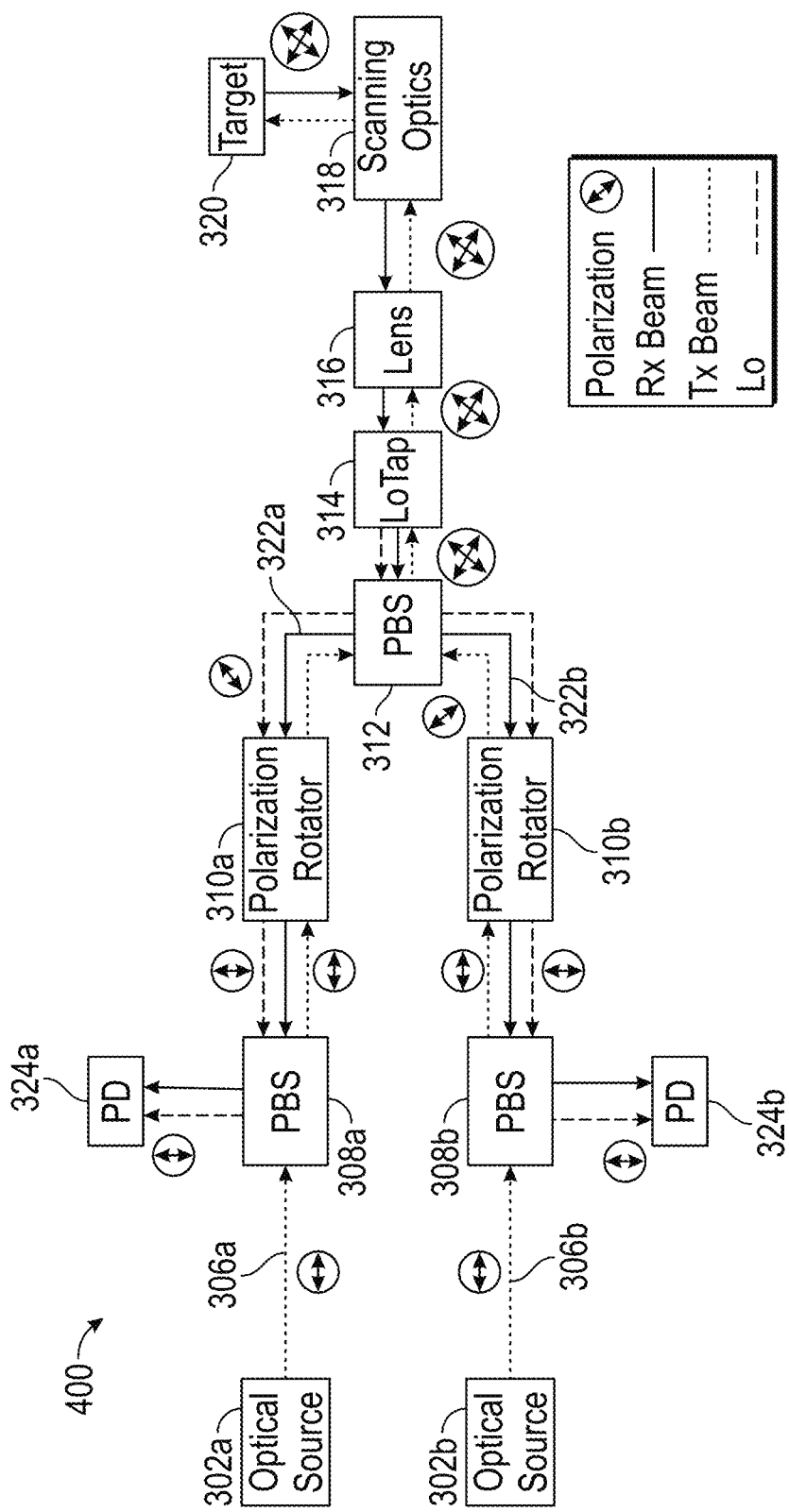
FIG. 4 illustrates another example LiDAR system according to example embodiments of the present disclosure.

FIG. 4 illustrates another example LiDAR system according to example embodiments of the present disclosure. The LiDAR system 400 is similar to the LiDAR system 300 of FIG. 3, except that the LiDAR system 400 includes two optical sources, referred to herein as optical source 302a, which generates optical signal 306a, and optical source 302b, which generates optical signal 306b. Thus, each transmitted optical beam originates from a separate source rather than being split off from a common source by a beam splitter.

Additionally, the frequency modulation may be performed by the optical sources themselves, rather than within a separate modulation circuitry external to the optical sources. Accordingly, the optical beam 306a generated by the optical source 302a can include the up-chirp signal and the optical beam 306b generated by the optical source 302b can include the down-chirp signal.

The LiDAR system 400 also includes a first polarization beam splitter 308a and a second polarization beam splitter 308b. The polarization beam splitters 308a and 308b are configured to pass their respective optical beams 306a and 306b to one of two output ports depending on the polarizations of the optical beams. For the outgoing optical beams, the polarization of both beams is such that both optical beams 306a and 306b are passed to corresponding polarization rotators 310a and 310b.

The polarization rotators 310a and 310b are configured to rotate the polarization of an optical beam by a specified amount for any optical beam passing through. In this example, the polarization rotator 310a is configured to apply 45 degrees of rotation to the first optical beam 306a and the polarization rotator 310b is configured to apply negative 45 degrees of rotation to the second optical beam 306b. Accordingly, as shown in FIG. 3, the polarizations of the first optical beam 306a and the second optical beam 306b differ by ninety degrees at the outputs of the polarization rotators 310a and 310b, i.e., the first optical beam 306a and the second optical beam 306b are orthogonal.

The first optical beam 306a and the second optical beam 306b are received at different ports of a polarization beam splitter 312, which combines the two beams into a single optical beam with a first polarization component and a second polarization component that is orthogonal to the first polarization component which results in the two components each being linearly polarized.

The LiDAR system 400 also includes one or more local oscillator taps to provide a low power local oscillator signal. In the example shown in FIG. 4, the LiDAR system 400 includes a single local oscillator tap 314, which is configured to receive the output of the polarization beam splitter 312 to provide both local oscillator signals.

The LiDAR system 400 also includes lensing optics 316 and scanning optics 318, each configured to transmit the combined optical beam towards a target, and collect light incident upon the target into a return path, the light being collected into a return optical beam. Additional lensing optics and scanning optics may be included for transmitting additional optical beams. It will also be appreciated that in some use cases, there will be more than one target and possibly several targets.

The return optical beam reflected from the target will have the same or similar polarization state as the incident optical beam. Thus, the return optical beam will also include two linear orthogonal polarization components, although there may be some polarization crosstalk between the two components. The return beam is received at the local oscillator tap 314 where the return beam mixes with a local oscillator signal. Specifically, in the example shown in FIG. 4, the two orthogonal components of the return beam are combined with the two orthogonal components of a local oscillator signal.

The return beam and the local oscillator signal are both received at the polarization beam splitter 312, which splits the beams to different outputs, depending on the polarization. The components of the return beam and the local oscillator signal that have a 45-degree polarization are returned to polarization rotator 310a, and the components of the return beam and the local oscillator signal that have a negative 45-degree polarization are returned to polarization rotator 310b. Thus, each polarization component of the return beam remains combined with its corresponding local oscillator signal of the same polarization. The return beams are shown in FIG. 4 as a first return beam 322a and second return beam 322b.

The first return beam 322a is received by the polarization rotator 310a, which applies 45 degrees of rotation to the first return beam 322a and its corresponding local oscillator. The second return beam 322b is received by the polarization rotator 310b, which applies negative 45 degrees of rotation to the second return beam 322b and its corresponding local oscillator. Accordingly, both of the return beams 322a and 322b that exit the polarization rotators on the return path are transformed to the same polarization state, which is shown in FIG. 4 as vertical. Additionally, each of the return beams 322a and 322b is orthogonal to their corresponding outgoing beams, which enables the return beams to be diverted along a non-reciprocal optical path by the polarization beam splitters 308a and 308b.

The first return beam 322a and its corresponding local oscillator signal are both directed to a first photodetector 324a by the polarization beam splitter 308a. At the same time, the second return beam 322b and its corresponding local oscillator signal are both directed to a second photodetector 324b by the polarization beam splitter 308b. The frequency difference between the first return beam 322a and the local oscillator signal are detected as a first beat frequency, while the frequency difference between the second return beam 322b and the local oscillator signal are detected as a second beat frequency. As explained above in relation to FIG. 2, the range and velocity of the target are determinable from the first beat frequency and the second beat frequency.

Using the procedures described in FIG. 4, embodiments of the present disclosure can be configured to perform polarization multiplexing with more than one optical source. In this fashion; one or more processors (e.g., signal processor 112 in FIG. 1) can be configured to calculate distance, range and/or velocity simultaneously based on the simultaneous transmission of the up-chirp and down-chirp signals in a manner that mitigates engineering complexities traditionally caused by conventional wavelength multiplexing (or similar) techniques. In some scenarios, the LiDAR system 400 of FIG. 4 may be advantageous for environments that are expected to present a greater degree of polarization crosstalk, including outdoor environments such as roadways, and others. The LiDAR system 400 is also configured to be less susceptible to polarization crosstalk due to small differences in the frequencies emitted by each of the optical sources 302a and 302b. Although each optical source 302a and 302b may be configured to operate at the same nominal frequency, the actual frequency of each optical source will be slightly different due to manufacturing tolerances. If any portion of signal 306a from the optical source 302a mixes with the return signal 322b the difference in frequencies will prevent the signal 306a from the optical source 302a from affecting the beat frequency detected at photodetector 324b.

Figure 5:
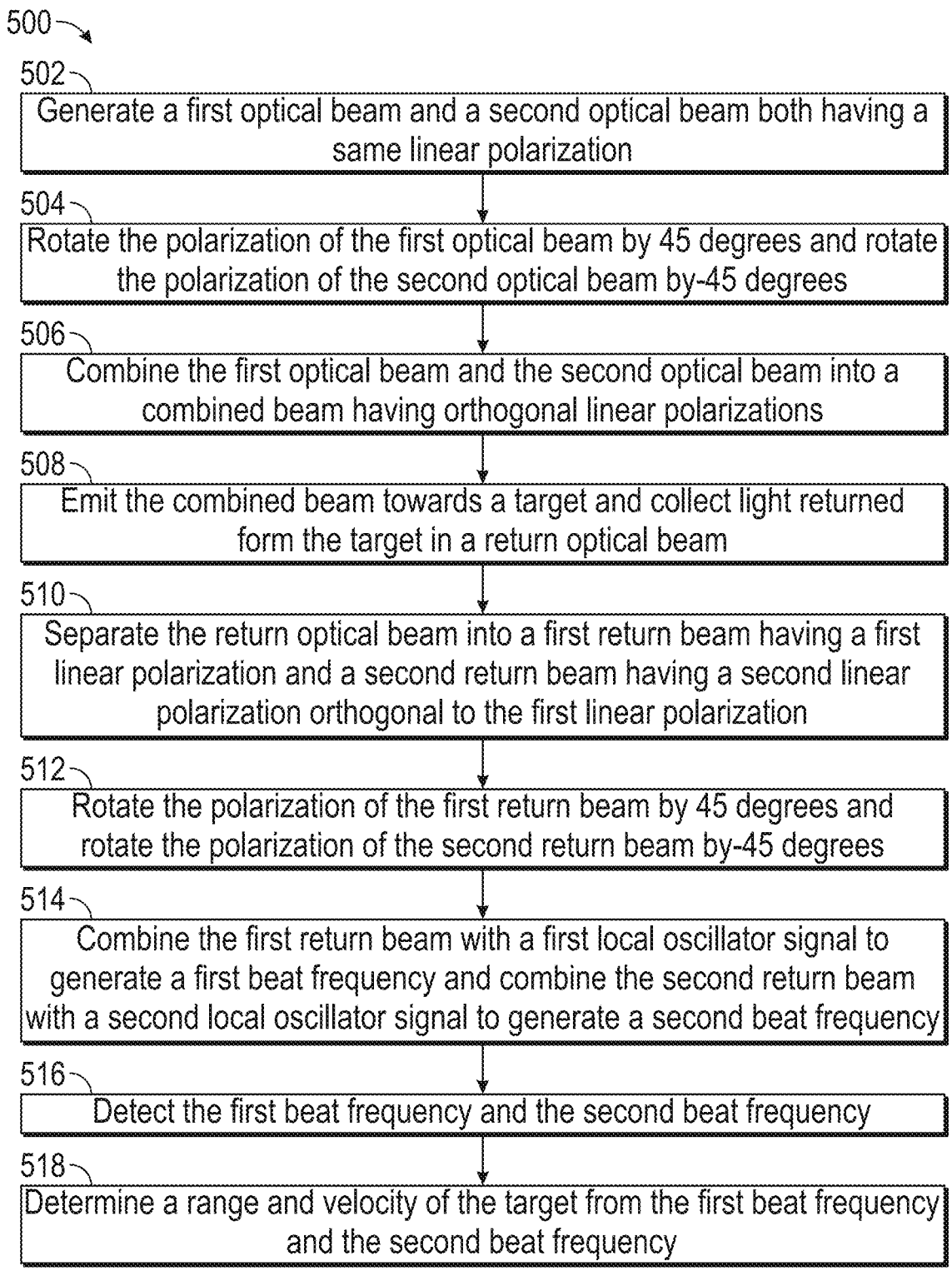
FIG. 5 is a process flow diagram of an example method for measuring range and velocity of an object, according to an embodiment of the present disclosure.

FIG. 5 is a process flow diagram of an example method for measuring range and velocity of an object, according to an embodiment of the present disclosure. The method 500 may be performed by any suitable LiDAR system, including the LiDAR systems 300 and 400 described above. The method may begin at block 502.

At block 502, a first optical beam and a second optical are generated, with each beam having a same linear polarization. In some embodiments, the first optical beam and the second optical beam both originate from the same optical source and are separated by a beam splitter. In some embodiments, a first optical source is used to generate the first optical beam and a second optical source is used to generate the second optical beam.

At block 504, the polarization of the first optical beam is rotated by 45 degrees and the polarization of the second optical beam is rotated by −45 degrees. The rotation of the optical beams may be accomplished through any suitable type of polarization rotator. At the output of the rotators, the first optical beam and the second optical beam will be orthogonal to one another.

At block 506, the first optical beam and the second optical beam are multiplexed into a combined optical beam having orthogonal linear polarizations. For example, the beams may be multiplexed and/or demultiplexed through a polarization beam splitter (e.g., combining two or more optical signals into a combined optical beam in a way that enables the beams to be later separated)).

At block 508, the combined beam is emitted towards a target and light reflected from the target is collected as a return optical beam. The combined beam may be emitted using any suitable optical arrangement including lensing optics, scanning optics, and others.

At block 510, the return optical beam is demultiplexed into a first return beam having a first linear polarization and a second return beam having a second linear polarization orthogonal to the first linear polarization. The return optical beam may be demultiplexed using the same polarization beam splitter used to multiplex the outgoing optical beams at block 506.

At block 512, the polarization of the first return beam is rotated by 45 degrees, and the polarization of the second return beam is rotated by −45 degrees. The rotation of the polarizations may be due to the return beams passing through the same polarization rotators described in block 504 but along a return path. After the rotations at block 512, the first return beam and the second return beam will have the same polarization.

At block 514, the first return beam is combined with a first local oscillator signal to generate a first beat frequency, and the second return beam is combined with a second local oscillator signal to generate a second beat frequency. The return beams may be combined with their respective oscillator signals at the same location as shown in FIGS. 3 and 4. In other words, a multiplexed local oscillator may be generated by the local oscillator tap 314 and combined with the multiplexed return beams before the return beams are demultiplexed at block 510. However, the return beams may also be combined with their respective oscillator signals separately using separate local oscillator taps. For example, a first local oscillator tap may be disposed between polarization rotator 310a and polarization beam splitter 308a, and second local oscillator tap may be disposed between polarization rotator 310b and polarization beam splitter 308b. Other arrangements are also possible.

At block 516, the first beat frequency and the second beat frequency are detected. One of the beat frequencies represents the beat frequency $\Delta f_{up}$ caused by the up-chirp, and the other beat frequency represents the beat frequency $\Delta f_{dn}$ caused by the down-chirp. The beat frequencies may be detected by photodetectors configured to receive the first return beam and the second return beam and convert the return beams from optical signals into electrical signals.

At block 518, a range and velocity of the target is determined from the first beat frequency and the second beat frequency as described above in relation to FIG. 2. The range and velocity may be computed by a processor, such as the signal processing unit 112 shown in FIG. 1.

It will be appreciated that embodiments of the method 500 may include additional blocks not shown in FIG. 5 and that some of the blocks shown in FIG. 5 may be omitted. Additionally, the processes associated with blocks 502 through 518 may be performed in a different order than what is shown in FIG. 5.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LiDAR) system, comprising:
    a first beam splitter to multiplex a first optical beam and a second optical beam into a combined beam having orthogonal linear polarizations;
    a local oscillator that splits a portion of the combined beam to generate a multiplexed local oscillator signal having orthogonal linear polarizations;
    an optical arrangement comprising lensing optics configured to emit the combined beam towards a target and collect light returned from the target in a return optical beam, wherein the first beam splitter demultiplexes the return optical beam and the multiplexed local oscillator signal into a first return beam combined with a first local oscillator signal and a second return beam combined with a second local oscillator signal, and wherein the first return beam and the first local oscillator signal generate a first beat frequency and the second return beam and the second local oscillator signal generate a second beat frequency; and
    a signal processing system to determine a range and velocity of the target from the first beat frequency and the second beat frequency.

2. The LiDAR system of claim 1, further comprising an optical source and a second beam splitter, wherein the first optical beam and the second optical beam both originate from the optical source and are separated by the second beam splitter.

3. The LiDAR system of claim 1, further comprising a first optical source to generate the first optical beam and a second optical source to generate the second optical beam, wherein the first optical beam and the second optical beam have a same polarization at an output of the first optical source and the second optical source.

4. The LiDAR system of claim 1, further comprising:
    a first polarization rotator to receive the first optical beam, and a second polarization rotator to receive the second optical beam, wherein the orthogonal linear polarizations are created by passing the first optical beam through the first polarization rotator and passing the second optical beam through the second polarization rotator.

5. The LiDAR system of claim 4, wherein the first polarization rotator is to provide approximately 45 degrees of rotation to a linear polarization of the first optical beam, and the second polarization rotator is to provide approximately −45 degrees of rotation to a linear polarization of the second optical beam.

6. The LiDAR system of claim 4, wherein the first polarization rotator and the second polarization rotator are faraday rotators.

7. The LiDAR system of claim 4, wherein the first return beam passes through the first polarization rotator along a first return path, and the second return beam passes through the second polarization rotator along a second return path.

8. The LiDAR system of claim 7, wherein the first return beam and the second return beam have a same polarization after passing through the first and second polarization rotators.

9. The LiDAR system of claim 6, further comprising:
    a second polarization beam splitter to direct the first return beam to a first optical detector, wherein the first optical beam and the first return beam have orthogonal linear polarizations at the second polarization beam splitter; and
    a third polarization beam splitter to direct the second return beam to a second optical detector, wherein the second optical beam and the second return beam have orthogonal linear polarizations at the third polarization beam splitter.

10. The LiDAR system of claim 1, wherein the first optical beam and the second optical beam have a same signal frequency.

11. A method of light detection and ranging (LiDAR), comprising:

multiplexing a first optical beam and a second optical beam into a combined beam having orthogonal linear polarizations;

splitting a portion of the combined beam to generate a multiplexed local oscillator signal comprising a first local oscillator signal and a second local oscillator signal;

emitting the combined beam towards a target and collecting light returned from the target in a return optical beam;

demultiplexing the return optical beam and the multiplexed local oscillator signal into a first return beam combined with the first local oscillator signal and a second return beam combined with the second local oscillator signal, and wherein the first return beam and the first local oscillator signal generate a first beat frequency and the second return beam and the second local oscillator signal generate a second beat frequency; and determining a range and velocity of the target from the first beat frequency and the second beat frequency.

12. The method of claim 11, further comprising generating the first optical beam and the second optical beam at a same optical source and separating the first optical beam and the second optical beam by a beam splitter.

13. The method of claim 12, wherein the first optical beam and the second optical beam have a same linear polarization at an output of the beam splitter.

14. The method of claim 11, further comprising generating the first optical beam at a first optical source and generating the second optical beam at a second optical source.

15. The method of claim 14, wherein the first optical beam and the second optical beam have a same linear polarization at an output of the first optical source and the second optical source.

16. The method of claim 11, wherein multiplexing the first optical beam and the second optical beam into the combined beam having orthogonal linear polarizations comprises:

rotating a linear polarization of the first optical beam in a first direction; and rotating a linear polarization of the second optical beam in a second direction opposite the first direction.

17. The method of claim 11, wherein multiplexing the first optical beam and the second optical beam into the combined beam having orthogonal linear polarizations comprises:

rotating a linear polarization of the first optical beam by approximately 45 degrees; and rotating a linear polarization of the second optical beam by approximately −45 degrees.

18. The method of claim 11, wherein multiplexing the demultiplexing are performed by a same beam splitter.

19. The method of claim 11, further comprising rotating a polarization of the first return beam and rotating a polarization of the second return beam to cause the first return beam and the second return beam to have a same linear polarization.

20. The method of claim 11, further comprising directing the first return beam to a first optical detector using a polarization beam splitter, wherein the first optical beam and the first return beam have orthogonal linear polarizations at the polarization beam splitter.

* * * * *